United States Patent
Spaur et al.

(10) Patent No.: US 6,625,578 B2
(45) Date of Patent: Sep. 23, 2003

(54) ON-LINE GAME PLAYING WITH ADVERTISING

(75) Inventors: Charles W. Spaur, Aurora, CO (US); Edward Lappin, Boulder, CO (US); James M. Wisler, Englewood, CO (US)

(73) Assignee: Masque Publishing, Inc., Englewood, CO (US)

( * ) Notice: Subject to any disclaimer, the term of this patent is extended or adjusted under 35 U.S.C. 154(b) by 383 days.

(21) Appl. No.: 09/797,117

(22) Filed: Feb. 28, 2001

(65) Prior Publication Data

US 2002/0013167 A1 Jan. 31, 2002

Related U.S. Application Data

(63) Continuation of application No. 09/052,886, filed on Mar. 31, 1998, now Pat. No. 6,196,920.

(51) Int. Cl.[7] .............................................. G06F 17/60
(52) U.S. Cl. ............................. 705/14; 705/1; 705/10; 463/40; 463/41; 463/42
(58) Field of Search .................... 705/1, 10, 14; 463/42, 40, 41

(56) References Cited

U.S. PATENT DOCUMENTS

| 5,073,931 A | 12/1991 | Audebert et al. ............. 380/23 |
| 5,083,271 A | 1/1992 | Thacher et al. ............. 364/411 |
| 5,343,239 A | 8/1994 | Lappington et al. .......... 348/12 |
| 5,643,088 A | 7/1997 | Vaughn et al. ................ 463/40 |
| 5,819,092 A | 10/1998 | Ferguson et al. ............ 395/701 |
| 5,823,879 A | 10/1998 | Goldberg et al. ............. 463/42 |
| 5,848,397 A | 12/1998 | Marsh et al. ................ 705/14 |
| 5,917,725 A | 6/1999 | Thacher .................... 364/410.1 |
| 5,947,746 A | 9/1999 | Tsai ....................... 434/307 A |
| 5,964,660 A | 10/1999 | James et al. .................... 463/1 |
| 5,974,398 A | 10/1999 | Hanson et al. ................ 705/14 |
| 6,012,984 A | 1/2000 | Roseman ...................... 463/42 |
| 6,196,920 B1 * | 3/2001 | Spaur et al. .................. 463/42 |

FOREIGN PATENT DOCUMENTS

WO        WO 97/40514   * 10/1997  ............ H01J/13/00

OTHER PUBLICATIONS

Dialog reference. "Online game revenue on rise", Computer Retail Week, p. 4, Apr. 7, 1997.*

* cited by examiner

Primary Examiner—Eric W. Stamber
Assistant Examiner—Raquel Alvarez
(74) Attorney, Agent, or Firm—Sheridan Ross P.C.

(57) ABSTRACT

The playing of games with advertising over a network, such as the Internet, is provided. The system for on-line game playing and advertising includes one or more client machines, game servers with advertisement servers, together with at least one database server. One advertisement is displayed using the client machine immediately after a validated detection of the completion of the game is made by the game server. This advertisement is displayed using the client machine for at least a predetermined time interval during which the player is not provided with control for removing the advertisement. Another advertisement is displayed using the client machine at the time the game is being played using game elements, such as card backs and banners. Advertising data is stored related to each displayed advertisement including the identity of the advertisement, when the advertisement was displayed, and the reaction to the advertisement by each player playing the on-line game utilizing a client machine.

4 Claims, 17 Drawing Sheets

ON-LINE GAME PLAYING WITH ADVERTISING

This application is a continuation of Ser. No. 09/052,886 filed Mar. 31, 1998, now U.S. Pat. No. 6,196,920.

FIELD OF THE INVENTION

The present invention relates to playing card and board games over a communications network and, in particular, to controlled displaying of advertisements on one or more computer screens.

BACKGROUND OF THE INVENTION

The Internet is being accessed by users for a variety of objectives including to socially and competitively interact with others as a form of entertainment. The playing of card and board games over the Internet (on-line games) enables players to enjoy the game with others who may reside at distant locations from each other, as well as permit them to chat while playing the game.

In some cases, each player is charged a direct fee for playing the on-line card and board game. This fee can have the effect of reducing the number of players who would otherwise want to play these on-line games. As with some other forms of entertainment, advertising of products and services has been used to limit or eliminate fees that might be charged to users or viewers in order to financially support the particular entertainment, such as television programs. In essence, the entity intended to be benefitted by the advertising assumes the costs associated with providing the entertainment service.

Typically, control over display of the advertisement is exclusively the domain of the presenter of the advertisement. That is, the viewer or user cannot initiate the start or terminate the advertisement provided by a particular media channel. The user or viewer could switch to another media channel or turn off the media channel having the advertisement in order to terminate the advertisement to that particular viewer. However, returning to the media channel having the advertisement would still result in its presentation until the entity responsible for the advertisement terminated it.

Advertisements are currently provided using the Internet. This on-line advertising includes display of advertisements at the same time other information is being displayed. Such advertisements are provided, for example, along the border (s) of the computer screen. Additionally, advertisements are displayed when playing on-line games. When playing a question and request-for-answer on-line game, it is known to interrupt the series of questions that are presented on the computer screen with an advertisement that continues for a predetermined time period and then further questions are posed for the player's response.

Even though on-line advertising is presently occurring, in light of the circumstances involving multiple players playing the same card or board game, previous advertising protocols and presentations would not be optimum. When playing on-line card or board games, it is important that the advertising not be intrusive or interfere with the game playing. The advertisement should benefit those players who wish to take advantage of the advertisement, while reducing the effect on those players who have little or no interest in the particular advertisement.

SUMMARY OF THE INVENTION

In accordance with the present invention, a system and method for providing advertisements while on-line card and board games are being played are provided. The system includes a database server for storing information related to advertisements that are to be provided to the on-line players. The database server also maintains advertising data and other information related to the use of the advertisements. The information related to the advertisements includes a reference or universal resource locator (URL) that allows the system to access the advertisement having the particular URL when the advertisement is to be displayed or otherwise provided. In this way, the advertisements themselves need not be stored with the database server. The advertising data or other information includes advertising accounting or activity data. Such activity data relates to, for each advertisement, when it was provided to the player and what response, if any, the player made when the advertisement was presented.

The system can include a database controller that communicates with the database server. The database controller is able to input the advertisement-related information, including new, modified or otherwise updated advertisements that are expected to be presented to the players. Additionally, such a database controller could access the database server to obtain advertising data indicative of the results of the particular advertisement, including whether or not the advertisement was acted upon by the player, for example, requesting additional information concerning the product and/or service that was associated with the advertisement.

The system also includes at least one game server. The game server has ultimate control over the game being played by one or more client machines, which communicate with the game server. Preferably, the game server is responsible for a single game that it downloads or otherwise sends to the one or more client machines that have access or are linked with the particular game server. For example, the game server may control play of a card game and download game information including game graphics to the client machines that the players will use to play the particular on-line card game. Preferably, the communication links between the game server and the client machines include the Internet.

With respect to the communications between the database server and the game server, the system preferably includes an advertisement (ad) server that is responsible for advertising-related communications with the game server. In one embodiment, when the game server receives advertising information, it determines that it is not responsible for handling such received information. This advertising information is then received by the ad server which does assume responsibility for taking control thereof. Alternatively to this foregoing chain-type configuration for deciding on responsibility for the received advertising information, the game server could exercise overall control. When advertising is received, it recognizes this information and passes it on or otherwise utilizes the ad server in connection with taking the proper action or control over the advertising information. For example, the game server determines that information related to advertisements is being received from the database server and the game server passes this advertising-related information to the ad server for handling including appropriate communications with one or more client machines. When advertisement-related information including statistical data is transmitted from the client machines, such control and protocol options could be selected for handling the responsibility of such information, including having the ad server directly communicating with the client machines. The ad server could also perform all or some of the functions associated with the optional database controller.

Although the client machines can include different components for performing a variety of functions, each client machine typically includes a computer processor, computer memory, a terminal or display screen, and one or more input devices, such as a keyboard and/or a mouse. The client machine communicates with the game server, which is able to download the version of the card or board game associated with the particular game server. The on-line game downloaded to the client machine includes executable software for playing the card or board game, which commonly has software-generated game graphics presented on the computer display screen. During the playing of the on-line game by the player of the client machine, game elements or items are displayed on the computer display screen that are typically manipulatable or otherwise activated by the player in playing the card or board game. Eventually, a player using one of the client machines that is playing the card or board game causes a game finishing function or activity. Immediately upon detection of this game finishing function, the game server validates its occurrence and thereby enables each client machine to provide the current advertisement to the player who is playing the on-line game that was just completed, to those who are observing the game and/or to those who are waiting to join in the next game. This advertisement can be provided by displaying text, audio, video and/or other graphics on the computer display screen. The advertisement promotes or otherwise provides information concerning one or more products and/or services identified by the advertiser. Preferably, the current or scheduled advertisement is displayed with the results of the just-completed on-line game. The game results, such as points achieved by each player or other game result parameters, are displayed on the computer screen including the identification of the player having the particular game results. In one embodiment, the current advertisement is displayed just above the game results in the center of the computer screen.

The current advertisement displayed immediately after completion of the on-line card or board game is displayed for at least a minimum predetermined time interval. During this time interval, each player through the respective client machine does not have control over the removal or termination of the particular advertisement then being displayed, except for a player's usual options, such as exiting the program or turning off the client machine. During this predetermined time interval, the player can elect to receive information related to the advertisement by "clicking on" or otherwise selecting the advertisement. This indication of interest by the player preferably results in the system initiating further activity, including inquiring as to whether this player wishes to have further information sent, such as by mail, telephone, and/or by e-mail. Preferably, such options do not to permit the player to exit the game environment in order to receive more information about the advertisement. This option would slow game play and would likely be disruptive to other players, particularly where the on-line card or board game being played is a multi-player game.

Advertisement statistical data associated with the display of the advertisement is also stored with the database server, including the identity of the advertisement and what occurred when the advertisement was displayed, for example, whether or not one or more players expressed an interest in the advertisement. At the end of the predetermined time interval during which the player has this lack of control over the display of the advertisement, the client machine can then exercise control over continued display of the particular advertisement. That is, the computer screen displays an inquiry or prompt advising the player that he may elect to continue playing the on-line game or exit the game-playing environment. Once all players of the preceding game have decided, for example, to continue playing the on-line game, a new hand or setup of the same card or board game is displayed. As can be appreciated, depending upon the elections made by each player having the current advertisement on the player's client machine, such advertisement may be displayed longer on one client machine than on another player's client machine. Furthermore, before establishing a setup for the next game, each player waits until the last player of the previous game has made an election concerning whether or not to continue play.

Playing of the same game with a new setup then begins. As before, the game server continues to check whether or not a game finishing function has occurred. When this function is detected, the next advertisement is displayed. Preferably, this next advertisement has already been previously stored in the client machine computer memory during the play of the game. This advertising process continues through the playing of successive initiations and playing of the same on-line card or board game, where the players continue to elect to continue playing.

In addition to the advertisement displayed immediately at the completion of play, a further embodiment for advertising involves continuous or persistent display of one or more advertisements. Such continuous advertisements rely on game elements or objects that are continuously displayed while the game is being played. By way of example, when a card game is the game being played, the backs of the displayed cards can include one or more advertisements that present an entity's name, product and/or service. Other card or board game elements that can have advertisements include animated advertisements, illustrated money chips or tokens, table felt, other background material to the game being played, board game areas or board pieces utilized in playing the board game. When this other form of advertising is utilized, the database server also stores such advertisements, which include correlating control information that associates the advertisement with particular game elements or game graphics. In particular, when such advertisement information is received by the client machine, the downloaded software recognizes such information and associates it with the particular game element or elements in connection with generating the combination of the game element(s) and advertising that are displayed on the computer screen during the playing of the on-line game.

Based on the foregoing summary, a number of salient aspects of the present invention are readily seen. Advertisements can be displayed without interrupting on-line card or board game play. There is no intrusive or distracting advertisement while the game is played and immediately after the game is finished, the advertisement is presented to the players for a limited time. Preferably, the advertisement achieves its main objective of promoting products and services in the context of also displaying the results of the game that was just finished. Additionally, high-quality advertising can be displayed at the same time the game is being played using game objects or elements, such as cards, chips, banners, buttons, background materials, and/or board pieces. These game elements can be controllably correlated or associated with desired advertisements prior to the game being played. One method of control that focuses additional user attention to the game objects or elements that serve as advertisements is to create or have the game objects or elements first appear in the advertisement. Those objects or elements would be animated to move from the advertisement to the game, becoming an object or element used in the game. Game objects or elements can also be animated to move from the game into the ad, becoming part of the ad itself. Another method of control that focuses additional user attention to the game objects or elements that serve as advertisements is animation of the game objects or elements within the game itself. Upon certain actions or appearances of those game objects or elements, a user could respond. The advertisements themselves could inform the users which actions or appearances of game objects or elements warrant a response, the type of user response desired or accepted and the result of the user response. Accounting or informational records related to the advertisements are maintained. Such records can include the identity of the advertisement, when the advertisement was displayed, and how each player responded to the advertisement. The advertisement information to be displayed on the computer screens at the end of a game or which is part of on-line game playing is easily modified and effectively stored for later access and downloading.

Additional advantages of the present invention will become readily apparent from the following discussion, particularly when taken together with the accompanying drawings.

DETAILED DESCRIPTION

Figure 1:
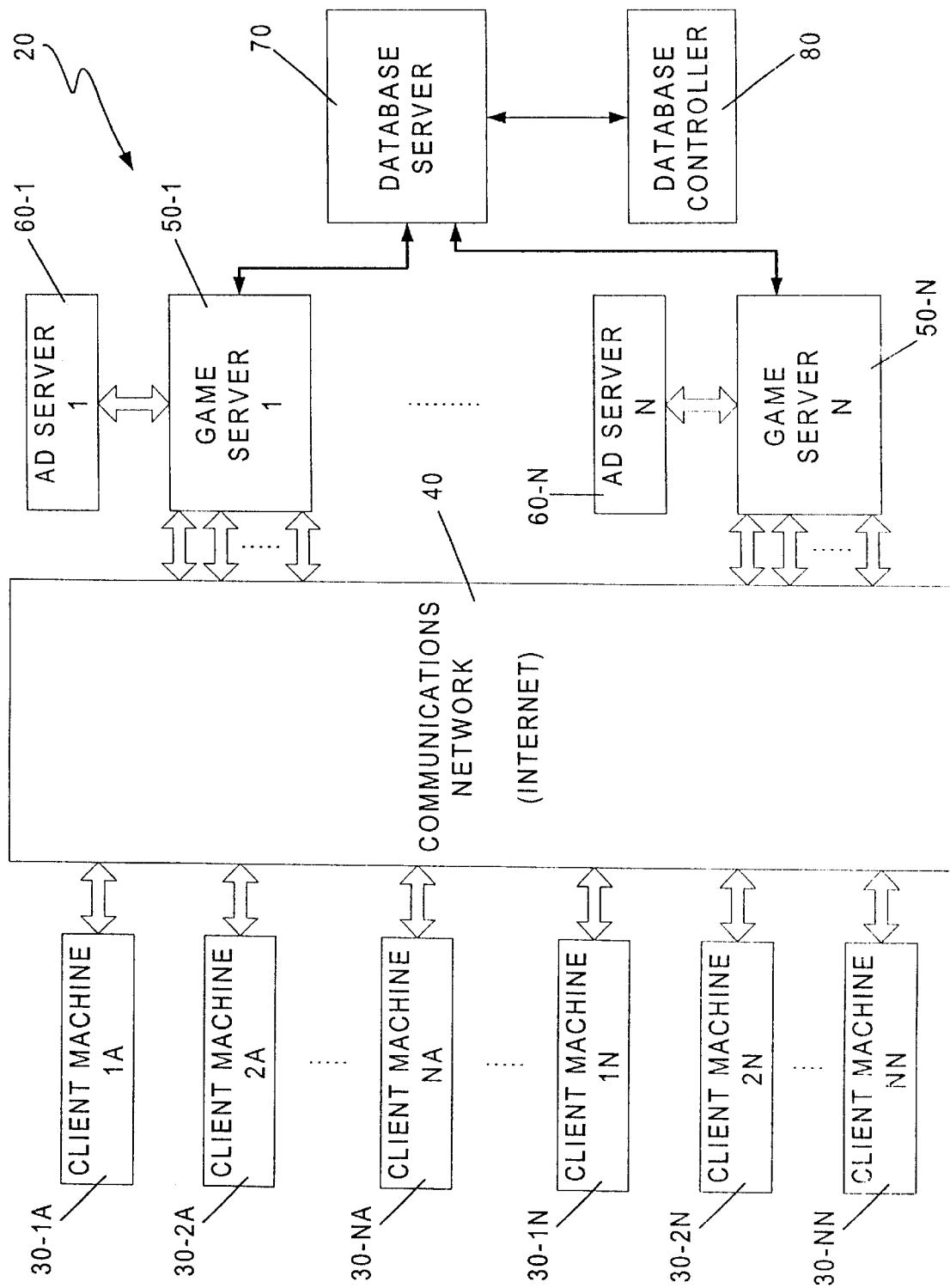
FIG. 1 is a block diagram of the system of the present invention that can include one or more client machines, game servers and associated advertisement servers.

With reference to FIG. 1, a system 20 for advertising when playing on-line card or board games is illustrated. The system 20 includes a number of client machines 30. Each client machine 30 is used or operated by a player of the particular game. Each client machine 30 commonly includes a computer with one or more processors, computer memory, a computer display screen, a computer keyboard, and other input/output devices including a mouse, speakers, hard disk drive and CD-ROM drive. In the context of playing the on-line card or board game, the computer screen displays the card or board game elements or pieces including changes thereof as a result of game-playing activities including movements caused by the player playing the game using the player's own client machine 30. Such game playing is accomplished using the mouse, keyboard, or other input device of the client machine 30.

As further illustrated in FIG. 1, the system 20 anticipates a number of sets of client machines 30, with each set having their respective players playing the same on-line card or board game with or against each other. By way of example, players having client machines 30-1a ... 30-na are playing a particular on-line card or board game with each other, while players having client machines 30-1n ... 30-nn are playing that same particular game or a different game with each other. Each of the client machines transmits/receives data, messages, commands and/or other information utilizing a communications network 40, preferably the Internet. The communications network 40 enables each of the client machines 30 to communicate with the sub-system that provides the one or more on-line card or board games. As illustrated in FIG. 1, this sub-system includes one or more game servers 50, with each such game server 50, preferably, controlling only one type or kind of card or board game. That is, each game server 50 is dedicated to providing only one game, such as poker, blackjack, chess, checkers or some other card or board game. FIG. 1 illustrates game servers 50-1 ... 50-n, which indicates that n-types or kinds of games can be provided by the system 20. Current Internet communication protocols are utilized in providing the communications through the communications network 40 between the client machines 30 and the game servers 50.

Important to the present invention involves advertising on the computer screens of the client machines 30 when the on-line card or board games are being played. The invention also applies to on-line instances of individual and multi-player games such as slot machines, video poker machines, table games, bowling and pinball games. The system includes a number of advertisements or ad servers 60. A separate or individual ad server 60 communicates with a different one of the game servers 50. For example, ad server 60-1 communicates with game server 50-1 and ad server 60-n communicates with game server 50-n. Each ad server 60 is responsible for handling advertisement related traffic or information to and from the client machines 30 that are playing the on-line card or board game using the game server 50 that the ad server 60 communicates with. The advertising related information involving the ad server 60 includes advertising information that is to be sent to the associated client machines 30, which information is used in providing an advertisement using the client machine or machines 30, such as by means of their computer screens that display the particular advertisement. The ad server 60 is also involved with receiving advertisement statistical data that includes certain relevant facts related to the display or other use of the particular advertisement.

The system 20 also includes at least one database server 70 that communicates with one or more game servers 50. The database server 70 controls or is otherwise responsible for the advertising information. The database server 70 stores advertising information related to the advertisements to be provided to each game server 50 that it communicates with and also stores the advertisement statistical data that is obtained based on the presentation of the advertising at one or more of the client machines 30. With regard to advertising information that it stores for sending to the game servers 50, upon their request, such information is organized or stored in a database scripts table. The stored scripts define the advertising group that is valid for a given time period for a specified game server 50-1 . . . 50-n. Each script has an identifier, which is preferably sequential and unique (i.e. never re-used). The contents of the scripts table are identified by the following chart:

| Database "Scripts" Table | |
|---|---|
| Field | Description |
| Scriptid: | Unique identifier for the script |
| Comment: | Comment field, database & operator use only |
| StartTime: | Time/date stamp when script becomes valid |
| ValidTime: | Length of time script is valid |
| Mode: | Spare field |
| GameId: | Game to which this script applies |
| SubId: | Subset of this game to which script applies (used for tournaments and special events) |
| GroupId: | Id of top-level group for this script |

For the scripts that apply to the particular game server, such information is gathered by the database server 70 for sending to the particular game server 50. This operation will be described in greater detail later herein in conjunction with the explanation of FIG. 2. Briefly, the information gathered using the scripts table includes a universal resource locator (URL) that is relied on in accessing and obtaining the actual advertisement to be displayed or otherwise provided using the designated client machine 30. That is to say, the database server 70 itself does not store the advertisement but stores a reference or locator (URL) that the client machine 30 relies on in downloading to it the advertisement to be displayed on that client machine.

In addition to providing advertising information to the game servers 50, the database server 70 receives the advertisement statistical data. This advertisement data can include an indication that an advertisement was provided or displayed, the identity of the player to whom the advertisement was displayed, when the advertisement was displayed, the game being played when the advertisement was displayed, whether or not further advertising information was requested by the player based on the advertisement, and whether or not information was actually sent to the player based on the displayed advertisement. As will be described later, when an advertisement is provided to the client machine 30, the player has options that can be selected related to the advertisement. Advertisement statistical data is generated based on the response or responses taken by the players to the particular advertisement.

The system 20 may also include a database controller 80 that is able to communicate with the database server 70. The database controller 80 can be used to access the advertisement statistical or accounting data, to change or update advertising information that is used to present advertisements during the play of a particular on-line card or board game and/or enable advertising information providers to access the database server 70, typically under limited conditions and provided that all security requirements are met. The database controller 80 can therefore be involved with providing desired or requested outputs related to advertisement usage including controlling the running of further advertising-related programs or providing further requested information to a player making such a request.

Figure 2:
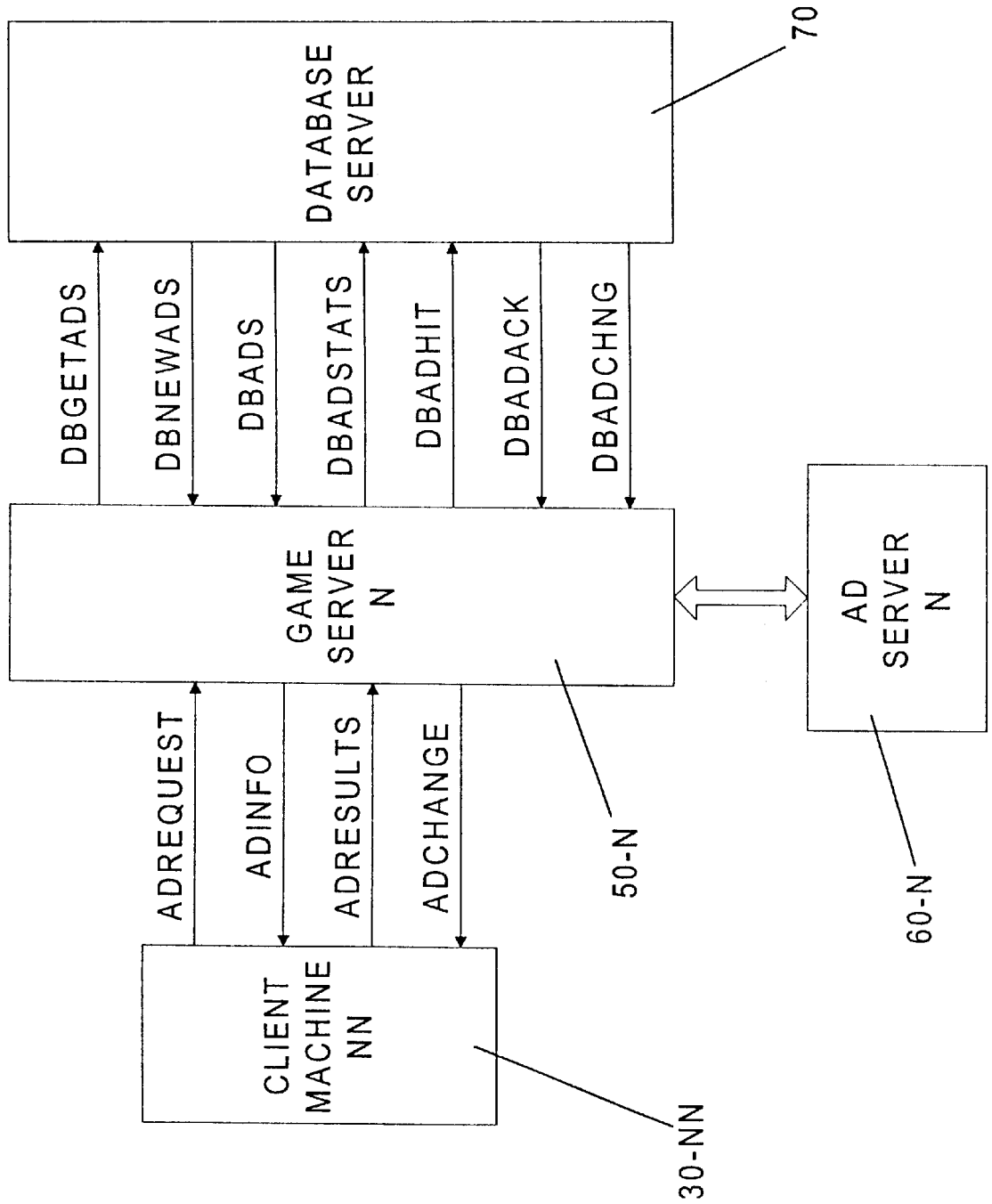
FIG. 2 is a block diagram illustrating communication paths among a representative client machine, game server and database server.

With reference to FIG. 2, more description related to the interaction among a client machine 30, a game server 50 and the database server 70 is provided. In that regard, certain communications are noted between the client machine 30-nn and the game server 50-n, as well as between the game server 50-n and the database server 70. These communications can be identified as follows:

adrequest—a request by the client machine 30-nn for advertising information from the game server 50-n that is responsible for the game the client machine 30-nn is playing or wishes to play.

adinfo—includes the advertising information that is to be used by the client machine 30-nn for displaying the advertisement based on such information.

adchange—provides an indication to the client machine 30-nn that advertising information for this client machine has changed and the client machine 30-nn must request new advertisements from the game server 50-n.

adresults—contains statistical data related to advertisement usage.

dbgetads—requests that the current advertisements for game server 50-n be provided by the database server 70.

dbnewads—informs the game server 50-n that a new packet of advertising-related information is being sent to it by the database server 70.

dbads—contains advertising information including: URL that is the location of the actual advertisement to be downloaded to the client machine 30-n; action to be taken when the player playing the on-line card or board game on the client machine 30-n selects the advertisement associated with this advertising information; subtype which identifies a subset of the on-line game being played, e.g., players involved in a tournament or other special promotion; minimum number of time in seconds that the advertisement is to be presented; and minimum number of seconds to display the advertisement before confirming that it has been presented.

dbadstats—advertising data sent to the database server 70 related to an individual advertisement presentation and includes: accounting identifier for the particular advertisement; the number of player-seconds the advertisement was displayed; the number of players that were shown this advertisement; the number of players that selected this advertisement; and the number of failures to read this advertisement.

dbadhit—information to the database server 70 that a particular player has selected an advertisement and additional actions are to be performed based on the selection of the advertisement by the player.

dbadack—game server 50-n receives this packet to acknowledge receipt of dbadstats or dbadhit.

dbadchng—information packet sent to the game server 50-n when a change in advertisements occurred.

The following addresses the functionalities of the ad server 60-n in cooperation with the game server 50-n, although it should be appreciated that such functionalities apply to any ad server 60 and its respective game server 50.

As previously noted, although the communication paths in FIG. 2 are shown emanating to and from the game server 50-n, the ad server 60-n essentially controls all of the advertisement traffic between the database server 70, the game server 50-n and the client machine 30-nn. With regard to advertisements that the ad server 60-n controls, they can be grouped into two categories. A first category relates to "variable advertisements" and a second category relates to "continuous advertisements." As utilized with the system 20, variable advertisements refer to advertisements that are provided to the client machines 30 at variable times based on the game playing of the players of the client machines 30, which receive such advertisements. The display of variable advertisements depends on the player or players completing play of the particular game since the advertisement is displayed on the computer screen of the client machine 30 immediately after the end of one game and before the start of the next, same game, such as a poker, blackjack, solitaire, chess or checkers game. That is, between the completion of one solitaire game and the start of the next solitaire game, the variable advertisement is displayed on the computer screen of the associated client machine 30. The continuous or persistent advertisement refers to an advertisement that is continuously, or substantially continuously, provided to the client machine during the playing of the on-line card or board game. The continuous advertisement or advertisements can be displayed on the computer screen using game elements or objects that contain or otherwise incorporate the advertisement. Such game elements can include card backs, money chips, banners, buttons, table felts, board areas, board pieces, and other game background materials. With respect to both variable and continuous advertisements, the ad server 60-n contains the pointers, controls and cached advertisement information, except for the advertisements themselves, for the associated on-line card or board game handled by the game server 50-n.

Once the ad server 60-n has accessed the database server 70, it receives the initial ads for the particular game. The data is organized into the proper groups and sequences so that the ad server 60-n can send ads to the client machine 30-nn. When the data are loaded, the ad server 60-n is ready to send the advertisements.

When the ad server 60-n is notified of a new player, it sends out the advertising information to the new client machine 30-nx (where x refers to the new client machine of this set). The ad server 60-n sends one variable advertisement and one or more continuous advertisements. This advertising information should fit in one packet for most client machines 30.

The ad server 60-n uses a timer to determine when the database server 70 should next be queried for new ads. The timer is based on information sent from the database server 70, indicating when the ad server 60-n is expected to check in again. Another timer is required for the timeout of database requests.

The ad server 60-n maintains a vector of arrays of ads. Each vector contains one ad group. In addition, each vector contains the header information for that group. These groups are processed for each player, generating an ad list for variable advertisements when a player starts a game. The client machine 30-nn receives one entry from each variable advertisement group and all of the entries from a continuous advertisement group. An entry may be an array of groups instead of ads. If this is the case, the ad server 60-n picks out one of the groups (if variable advertisement) or selects out of the sub-groups (if continuous advertisement) as required.

For each player, a position for each continuous advertisement is required. This position is passed to the client machine 30-nn and is returned when the next ad is requested. Thus, the client machine 30-nn, not the ad server 60-n, maintains the state of each player. However, by saving the position for each client machine 30-nn, the ad server 60-n can determine if the client machine 30-nn is properly advancing (and thus, probably showing ads).

To create these vectors, the ad server 60-n receives the ads from the database server 70. They are sent in order of down, then right as the group tree is traversed. A vector of the current path down the tree is maintained while building the tree. The ad server 60-n creates a new entry in the vectors when the level increases. When the level decreases, the ad server 60-n returns to the proper level. If the level is the same and count is false, a new branch is created at the same level as the last. Once these vectors are created, the ad server 60-n can pick the starting point for each player as they are seated.

When the ad server 60-n updates its ads from the database server 70, it creates a new tree and then replaces the old one with the new (when the new is loaded). At this time, each client machine 30-1$n$ through 30-nn is notified of the new ads. The ad server 60-n may use a timer to spread out the sending of packets to the players, minimizing the load spike. Also, if the player sends a request for the next ad with an old value that is no longer valid, the effect is the same as if the player requested new ads.

Advertisement data from the client machines 30 is maintained in a hash table. The advertisement statistical data are tallied using the accounting identifier. Using this value, the ad server 60-n adds the new values to the existing values, increasing the display counts, display times, and select times. When sufficient values are added to the list or when a time limit has expired, the data is flushed to the database server 70. When flushing, the hash table is stored away, merged with any previous stored hash table, and new hash table is created for new data. The data in the stored hash table is sent to the database server 70. If the database server 70 does not acknowledge the data, the data is kept until the next update. If acknowledged, the stored hash data is thrown out.

As previously noted, a database scripts table is utilized in obtaining advertising information from the database server 70. More specifically, the dbgetads packet from the ad server 60-n requests advertisements for a particular game associated with the game server 50-n and any game subset thereof. The dbgetads request also contains the identifier of the current script in use, if one exists. The database server 70 queries the scripts table for all scripts that apply to this particular game and associated game subset, if any. The database server 70 determines which of the returned scripts are valid at the current time. From these valid scripts, the database server 70 selects the one with the nearest expiration time and which nearest expiration time must be at least a certain predetermined time from the present time. If the current script, as identified in the dbgetads request, matches the returned script, then no new advertisements are available and the ad server 60-n is so informed. Using the current script identified to it, the database server 70 selects the group identified by the script. As groups can contain references to advertisements or to other groups, the database server 70 uses a recursive algorithm to collect all the advertisements for all of the groups and sub-groups. The advertising information is packed into dbads packets and sent to the ad server 60-n. The dbads packets are preceded by a dbnewads packet to advise the ad server 60-n of the incoming advertising information. The database server 70 tags or includes the accounting identifier with each such advertising information. The accounting identifier identifies the advertisement for the current presentation context and the context includes the previously noted script and group identifiers set out in the database scripts table or chart. When the ad server 60-n reports advertisement statistical data using the dbadstats packets, the database server 70 relies on the accounting identifier in connection with processing and storing such statistical data. Accordingly, database server 70 report generation programs are able to calculate advertisement statistical data based on a particular time period.

Additional descriptions of the system 20 are next provided in the context of its operation using an example of a particular on-line card game, namely multi-player solitaire. This card game is the subject of a pending U.S. patent application having Ser. No. 08/928,212 filed on Sep. 12, 1997 and entitled "Multiplayer Card Games Having Card Plays to Foundations." This patent application is hereby incorporated in its entirety by reference. As an overview, the providing of advertisements to one or more client machines 30 will be described in the context of players playing this on-line card game.

Figure 3:
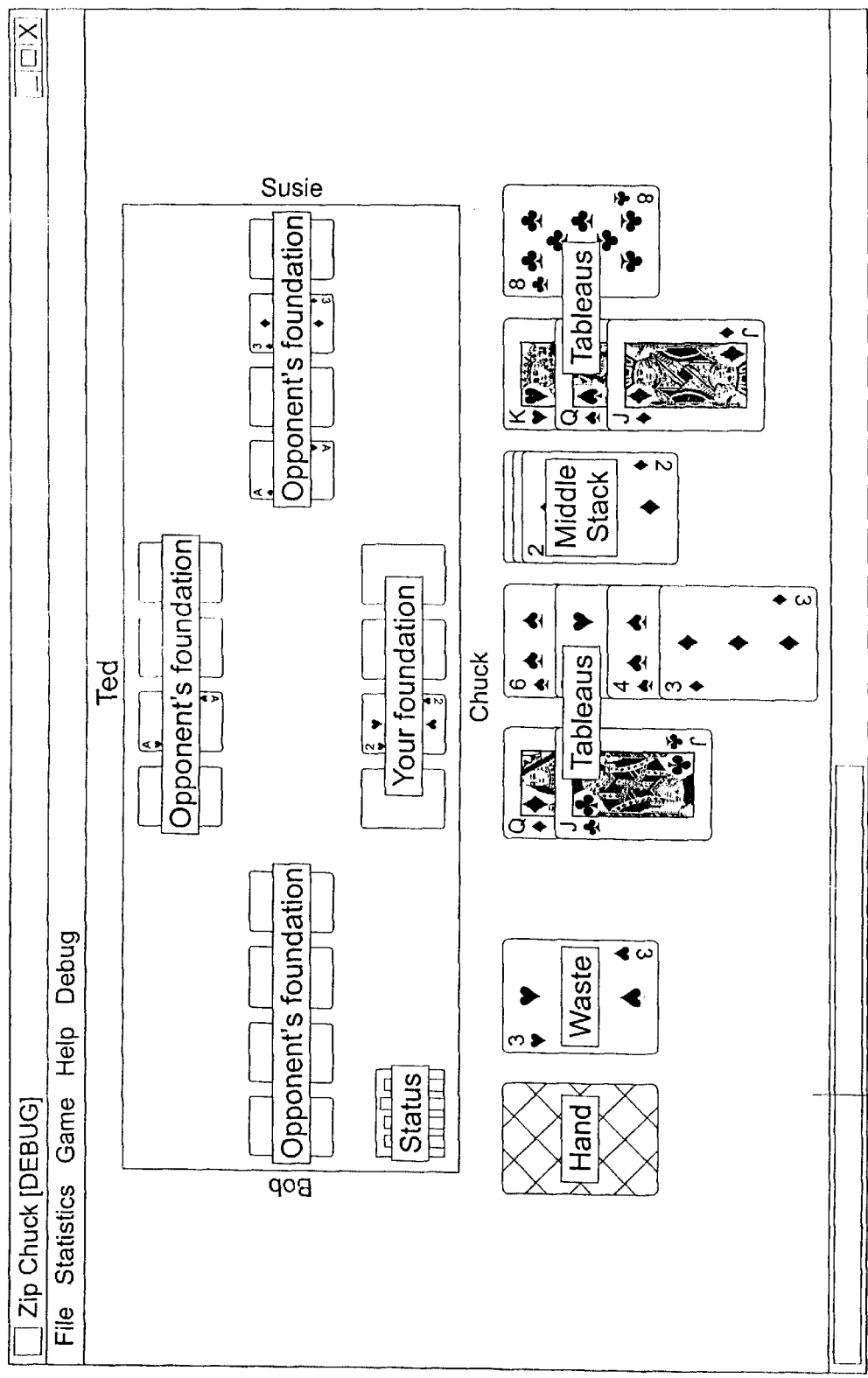
FIG. 3 illustrates a computer screen of a first player who is playing an on-line card game having an objective of removing all cards from a middle stack.

With reference to FIG. 3, the computer screen 84 of client machine 30-1a is illustrated as displaying a particular or representative card layout that occurred during the playing of the multiplayer solitaire card game. The computer screen 84 illustrated in FIG. 3 is being viewed by a first player (player one), who is playing the multiplayer solitaire card game with three other players. Briefly, the goal to winning the game involves emptying all cards from the "middle stack" as identified in FIG. 3. A much more detailed explanation of this multiplayer solitaire card game can be found in the afore-incorporated by reference patent application.

With respect to major steps involving client machine 30-1a receiving the solitaire card game, such includes the client machine 30-1a accessing the system 20 seeking to play this particular game. Upon accessing the system 20, such as by means of an Internet browser, the client machine 30-1a is linked to the game server 50-1 through the Internet 40. In response to the request by the client machine 30-1a of the first player, the game server 50-1 downloads the on-line card or board game with which it is associated, namely, the multiplayer solitaire card game. In conjunction with the downloading and receipt of this card game by the client machine 30-1a, it generates an adrequest that is processed by the ad server 60-1. And, through the game server 50-1, a dbgetads request is made to the database server 70. From this input request, the database server 70 develops the previously described dbads including advertising information from the database scripts table for sending to the ad server 60-1 through the game server 50-1. Assume that such advertising information includes at least variable advertisements that are to be displayed at the completion of play of each multiplayer solitaire card game. By means of the adinfo, the ad server 60-1 controls the sending of information related to a first advertisement based on the advertising information received from the database server 70. From the adinfo packet, the client machine 30-1a uses the URL related to the first advertisement in order to read in or load the first advertisement. The client machine 30-1a also requests that the ad server 60-1 send it the advertising information related to the second advertisement that it has already received from the database server 70. This advertising information related to the second advertisement is stored by the client machine so that it is prepared for presenting the second advertisement after playing of the next game (i.e. that game which is expected to be played after completion of the game presently being played).

Figure 4:
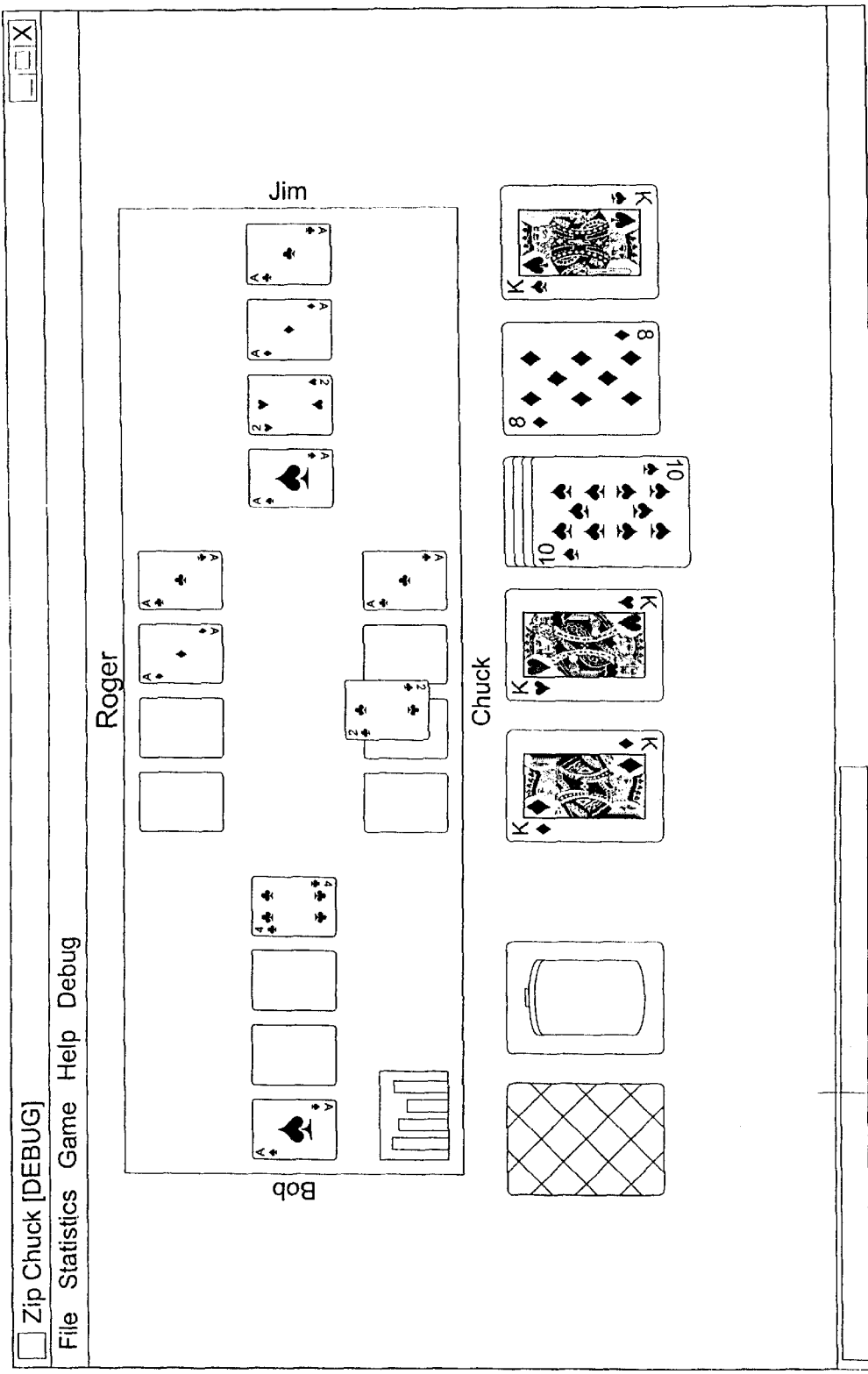
FIG. 4 illustrates the computer screen of the first player playing the on-line card game of FIG. 3 during a representative time that the game is being played.

With such advertising information now available to each of the client machines 30 who are playing together the same multiplayer solitaire game, reference is made to FIG. 4, which illustrates a specific instance in time during the play of this solitaire game. In particular, the depiction of the cards in FIG. 4 is indicative of a representative stage of the multiplayer solitaire card game. More specifically, FIG. 4 illustrates the computer screen 84 of player one having client machine 30-1a during the play of the solitaire game in which each player is attempting to empty all cards from their respective middle stacks, as explained more fully in the afore-incorporated patent application. The computer screen 84 of the client machine 30-1a also depicts the foundations of the other three players (player two, player three, player four) who are playing this solitaire game with player one. Each of these other three players is playing the game using a client machine, namely, client machines 30-2a, 30-3a and 30-4a. As can be understood from FIG. 4, player 1 has at least the ten of spades that needs to be removed from his middle stack. Each of the other three players also has cards in their middle stack. Consequently, the solitaire game is continuing or in progress.

Figure 5:
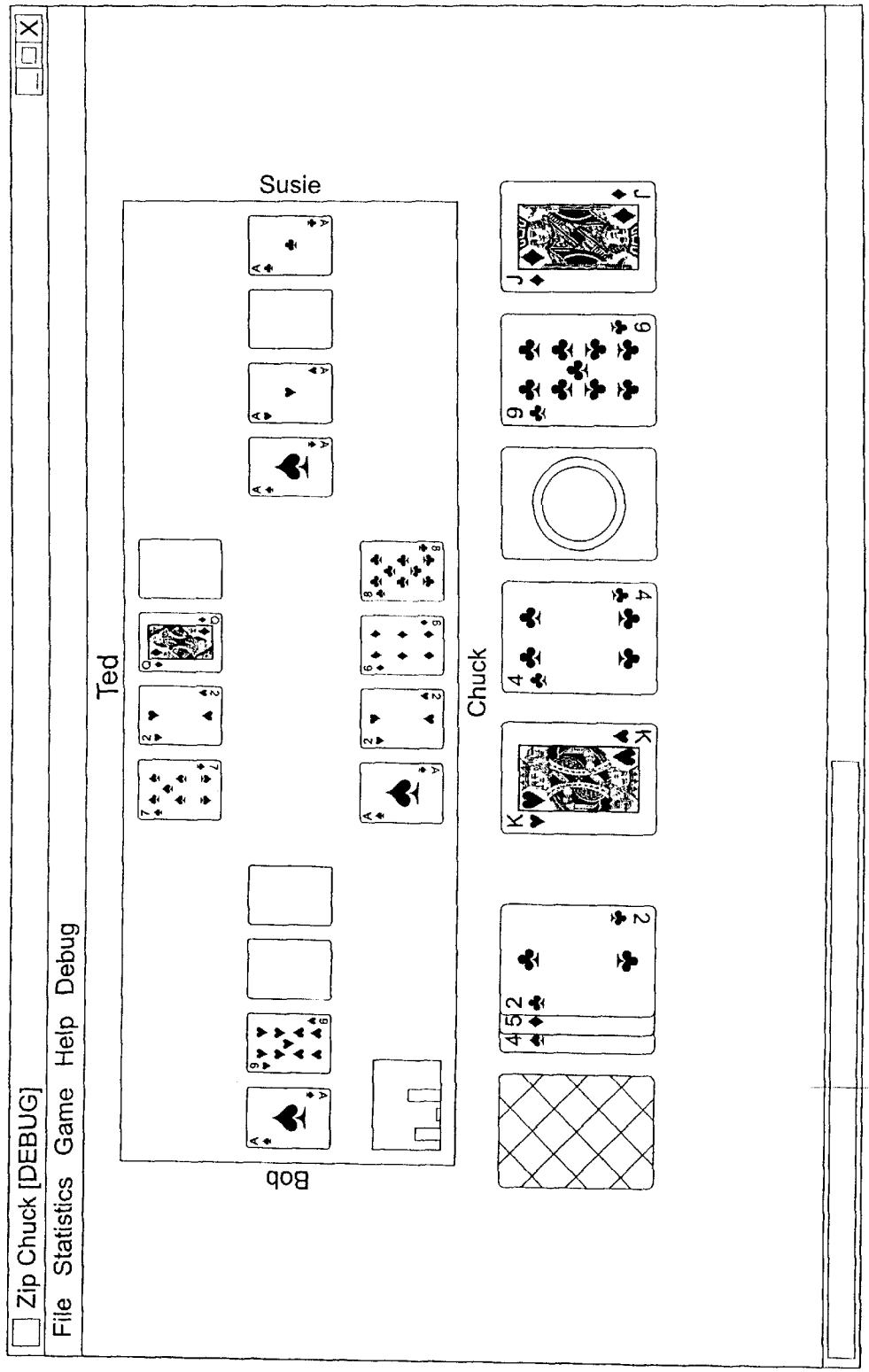
FIG. 5 illustrates the computer screen of the first player playing the on-line card game of FIG. 3 just after a game finishing function was made by moving the last card from the middle stack.

Referring to FIG. 5, the computer screen 84 of the client machine 30-1a used by player one is illustrated at a later time during the play of the same solitaire game involving the same four players. Notably represented in FIG. 4 is the emptying or removal of all cards from player one's middle stack, as the depiction of the computer screen 84 so indicates. The emptying of the last card in the middle stack of one of the players of the multiplayer solitaire game ends the game.

The game server 50-1, which has overall control of the game playing involving these four client machines 30-1a through 30-4a, receives an input from at least client machine 30-1a related to the last card being removed from the middle stack associated with this client machine. The game server 50-1 makes a determination or detects that all cards have been removed from the middle stack of player one. As can be appreciated, the game server 50-1 continuously checks throughout the playing of each such multiplayer solitaire card game as to whether or not this event has occurred. When this event is detected, the game server 50-1 verifies and confirms its detection to each of the client machines 30-1a through 30-4a. This confirming input to each of these client machines causes them to initiate display of the advertisement that was previously loaded by each of them using the URL for this particular advertisement. Thus, at the completion of the game play by removal of the last card from the middle stack of player one, each of these client machines 30-1a through 30-4a is able to immediately provide this advertisement, such as by displaying it on their respective computer screens.

Figure 6:
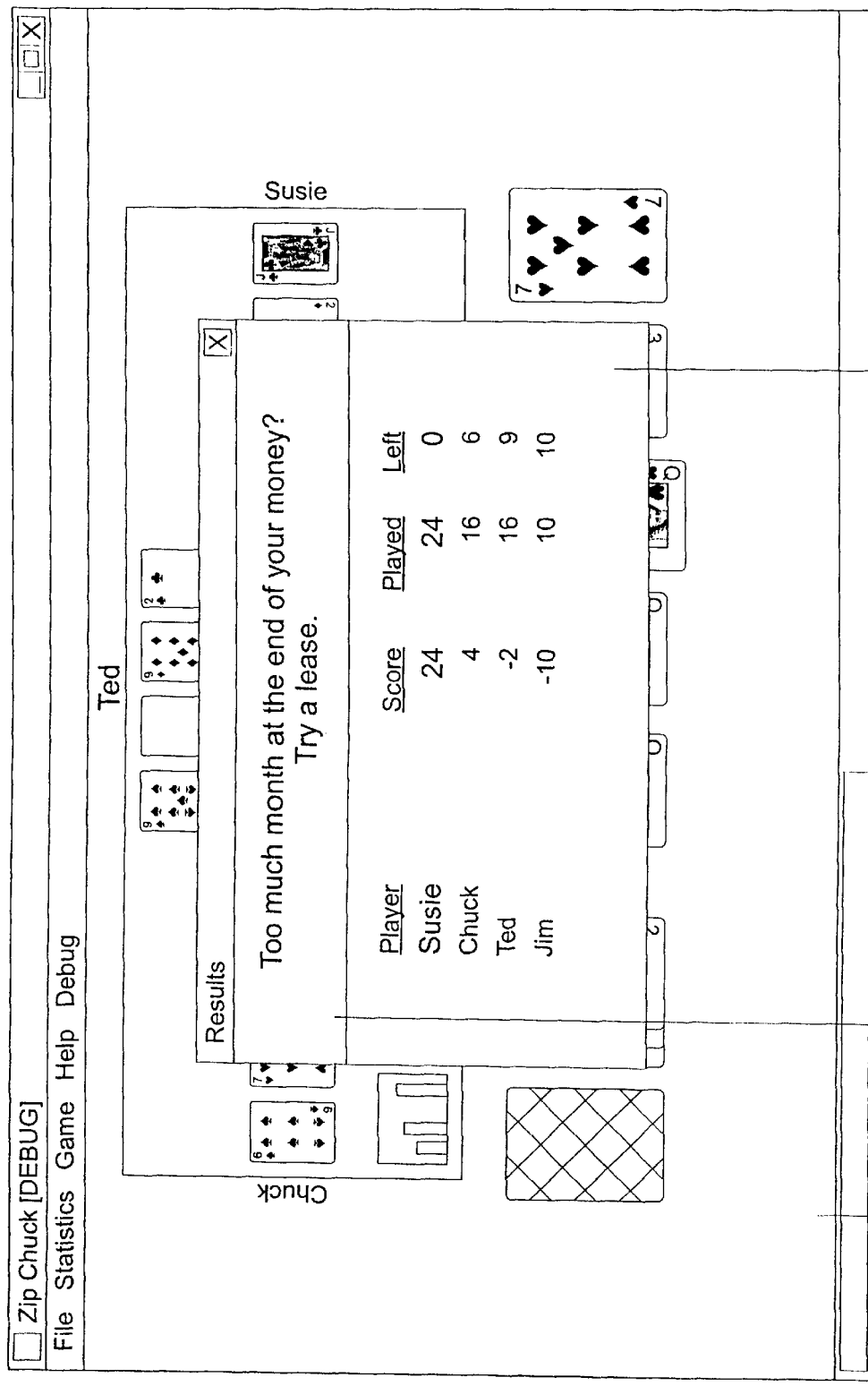
FIG. 6 illustrates the computer screen of a second player, who was playing the on-line game of FIG. 3, displaying representative game results and the advertisement that is presented immediately after the game finishing function.
Figure 7:
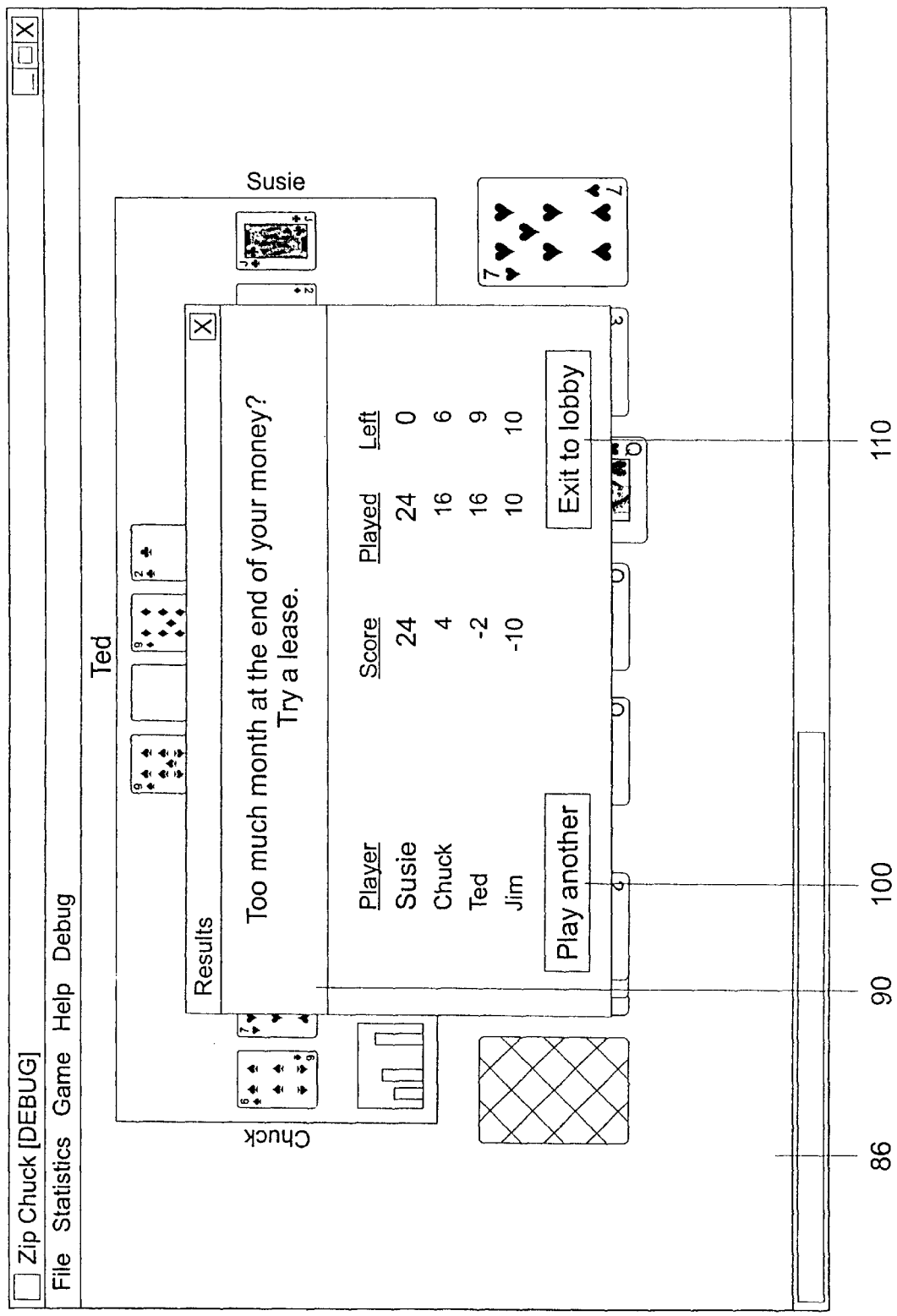
FIG. 7 illustrates the computer screen of the second player at the end of a predetermined time interval, during which time interval the advertisement is displayed and the second player effectively had no control over removal of the advertisement.
Figure 8:
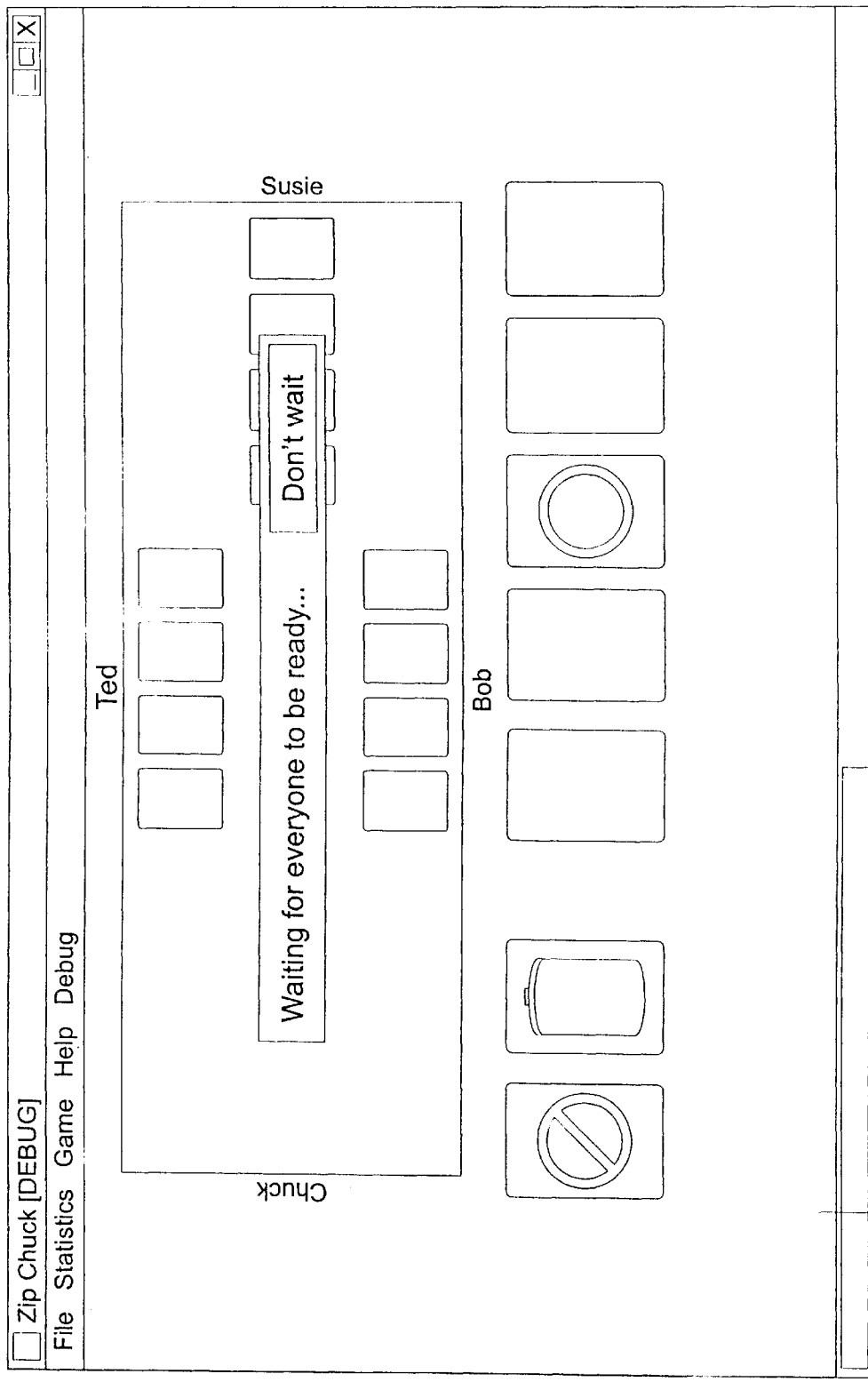
FIG. 8 illustrates the computer screen of the second player who was playing the on-line game of FIG. 3 and selected the "play another" prompt and is waiting for the first player to decide whether he will play another game.

With reference to FIG. 6, a representative display of such an advertisement 90 is provided on the computer screen 86 of the client machine. As can be seen, the advertisement is in the upper middle section of the computer screen 86 and overlies the card layout of player two on that player's client machine 30-2a, which existed at the time the last card was removed from the middle stack of player one. Preferably also, the advertisement 90 is accompanied by the results 96 of the game that was just played by these four players. This same advertisement 90, together with the game results 96, are displayed on the computer screens of each of the other three players. The advertisement 90 is displayed for at least a predetermined time interval. During this time interval, none of the players has any effective control over removal of the advertisement 90. That is, the advertisement 90 continues to be displayed. Other than exiting the program, turning the power off to their client machines or causing their client machines to be removed from the game setting, each client machine 30-1a through 30-4a will maintain this advertisement 90 for at least this predetermined time interval. At the end of the predetermined time interval, each client machine 30-1a through 30-4a continues to provide this advertisement. However, each client machine is also provided with one or more prompts or selectors that now enable each client machine 30-1a through 30-4a to remove the particular advertisement. With reference to FIG. 7, one embodiment for allowing each player to control removal or deletion of the advertisement 90 is illustrated. FIG. 7 depicts the computer screen 86 of client machine 30-2a of player two after the predetermined time interval, although the computer screens of the other client machines 30-1a, 30-3a, and 30-4a have an equivalent computer screen display. In this embodiment, each of the client machines 30-1a through 30-4a includes a first prompt or selector 100 that can be selected by the player to cause the removal of the advertisement 90 and also allow the player to indicate that he wishes to play another hand or set of the multi-player solitaire card game. As illustrated by FIG. 8, player two selected the "play another" prompt 100. FIG. 8 illustrates the computer screen of client machine 30-2a. The computer screen 86 indicates that this client machine 30-2a is waiting for at least one of the other three client machines 30-1a, 30-3a, 30-4a to receive an input related to the action that the players wish to take now that the predetermined time interval has expired. That is, each of the client machines 30-1a through 30-4a, under the control of its respective player, now controls or determines how long the advertisement will continue to be displayed.

Figure 9:
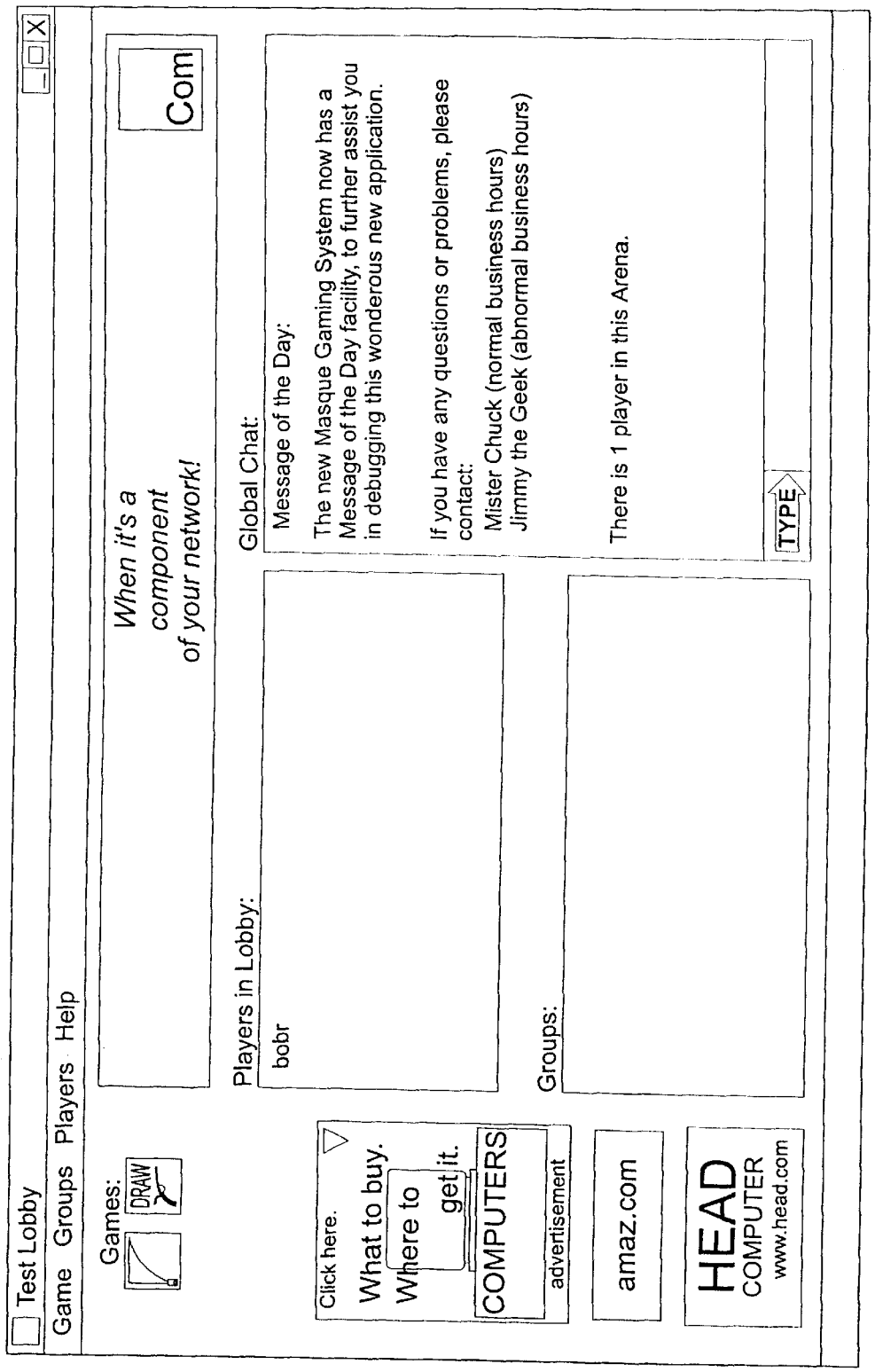
FIG. 9 illustrates a computer screen of a third player who was playing the on-line game of FIG. 3 and selected the "exit to lobby" prompt.

In this embodiment, a second prompt or selector is also provided in FIG. 7 identified as the "exit to lobby" selector 110. Selection of prompt 110 by a player causes the client machine to remove itself from the current game play setting (i.e. the ability to play the next hand of the same card game with the same players). FIG. 9 illustrates a representative computer screen of one of the four players, who elected to select or click on the exit to lobby prompt 110.

During the predetermined time interval while each player has no effective control over removal of the advertisement, each player does have the control through its respective client machine 30-1a through 30-4a to receive more information concerning the product, service and/or entity associated with the advertisement then being displayed on each player's computer screen. In one embodiment, the player is able to select more information related to the advertisement 90 by clicking on or otherwise selecting the advertisement 90 of FIG. 7.

Figure 10:
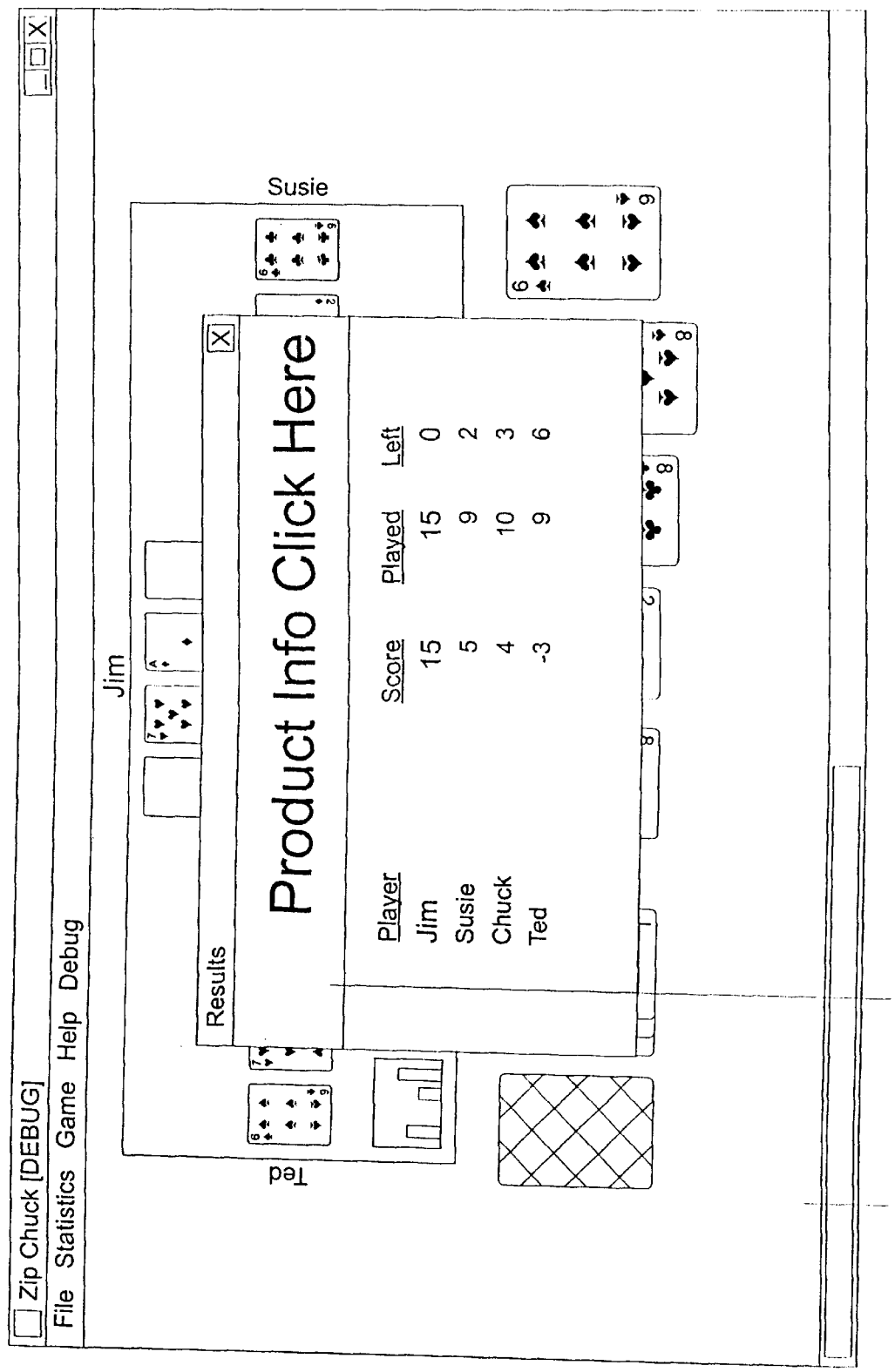
FIG. 10 illustrates a computer screen that is presented to a player who selects or clicks on the just displayed advertisement and now has the option of selecting to receive more information regarding the product being advertised.

An example of the election by player one to receive more product information based on the first advertisement is illustrated in FIG. 10. Clicking on the advertisement by player one using the client machine 30-1a results in more product information 120 being displayed on only the computer screen 84 of player one's client machine 30-1a, due to this player's election. The other three players, of course, have the same control capability for making the same election to receive more information concerning the particular advertisement then being displayed. As generally represented in FIG. 10, player one is provided with more product information related to the first advertisement. As can be appreciated, player one could continue to view such product information, while the other players of the card game just finished could have selected the "play another" prompt 100 and are waiting for player one to return in order to play the next game.

Figure 11:
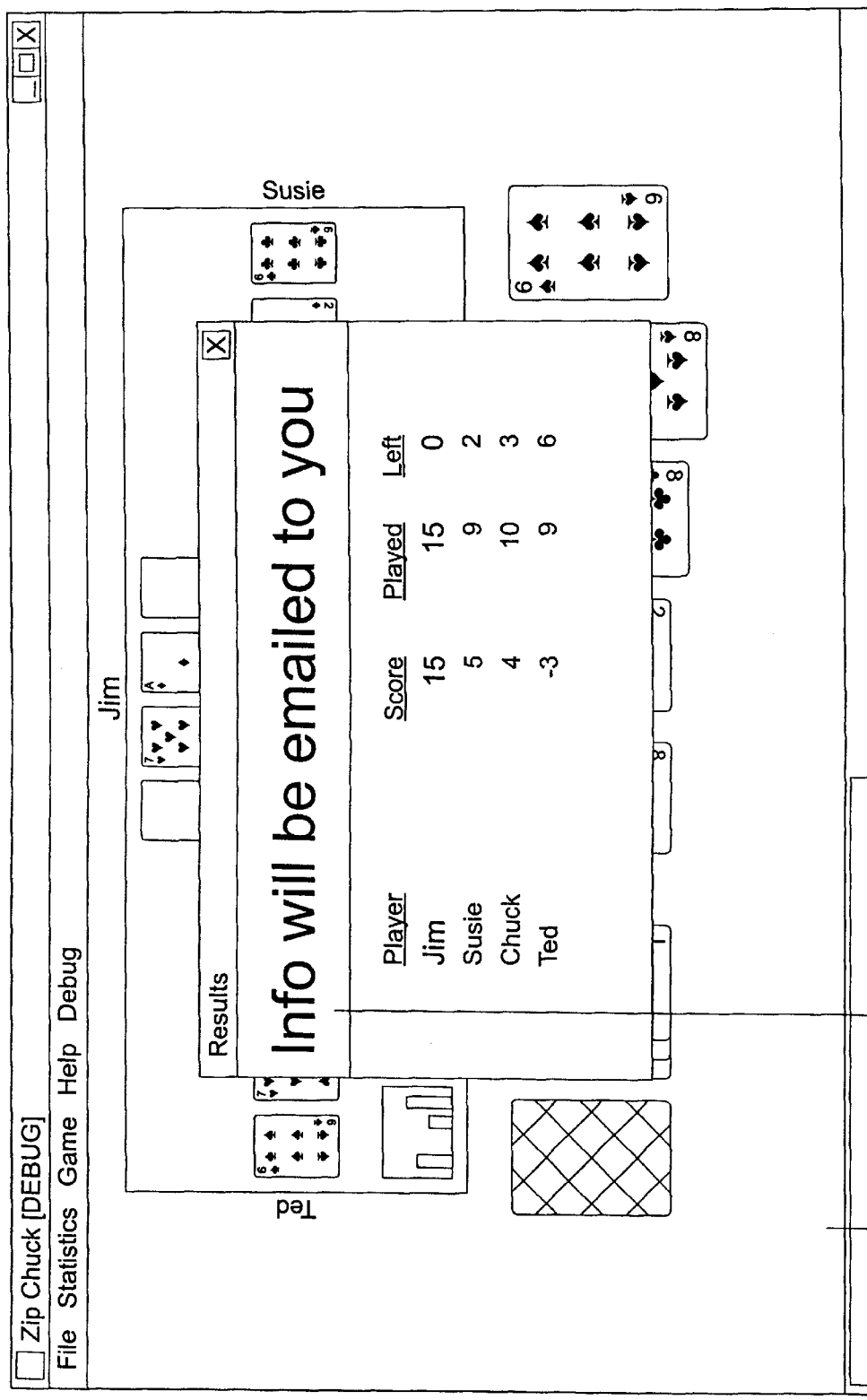
FIG. 11 illustrates a computer screen that informs the player, who requested more information related to the product being advertised, that such information will be e-mailed to that player.

The client machine 30-1a having the additional product information 120 has a further option of having more information related to the just-displayed advertisement sent to that player. As illustrated in FIG. 11, player one has elected to have further information sent to it related to the current advertisement. In accordance with FIG. 11, player one has elected to have such information e-mailed to him, and the indication 130 is provided on the player's computer screen 84 that such information is being e-mailed. As previously depicted in FIG. 7, after a predetermined time interval, player one is presented with a first prompt or selector 100 allowing player one to "play another" game and a second prompt or selector 110 allowing player one to "exit to lobby". Other ways of receiving additional information could also be made available for election including by a package of materials that is mailed to the player. Once these options for obtaining further information related to the advertisement have been completed, the client machine 30-1a then has the display on its computer screen 84 of the options for playing another game using the prompt 100 or exiting to the lobby using the prompt 110. After each of the four players has made his election, the next game can begin, assuming that each of the four players has selected the play another prompt 100. The game server 50-1 is then involved with controlling the display of the next game setup or card layout for each of these four players.

As previously discussed, the ad server 60-1 is also responsible for preparing advertisement statistical data for use by the database server 70. In that regard, such advertisement data that includes player one's selection of the advertisement and the decision to have more information sent to him are accounted for using the accounting identifier associated with the advertisement 90. All of the other previously noted statistical data is also generated and sent to the database server 70 including that the advertisement 90 was displayed to the other three players and what response they had to the advertisement 90, such as their election to select the "play another" selector 100 without receiving any more information related to the just-displayed advertisement. With regard to playing the next hand of the multi-player solitaire card game, at the same time or essentially the same time that the first or just-displayed advertisement was provided to each of the four client machines 30-1a through 30-4a, the next or second advertisement is being received by each of these four client machines to be stored for anticipated display thereof at the completion of the next game. As before, reliance on the URL received from the ad server 60-1 through the game server 50-1 is made in determining the location of this next advertisement so that it can be downloaded to each of these client machines 30-1a through 30-4a. Relatedly, the URL following this next advertisement is also prepared or stored for an expected later access and usage.

Figure 12:
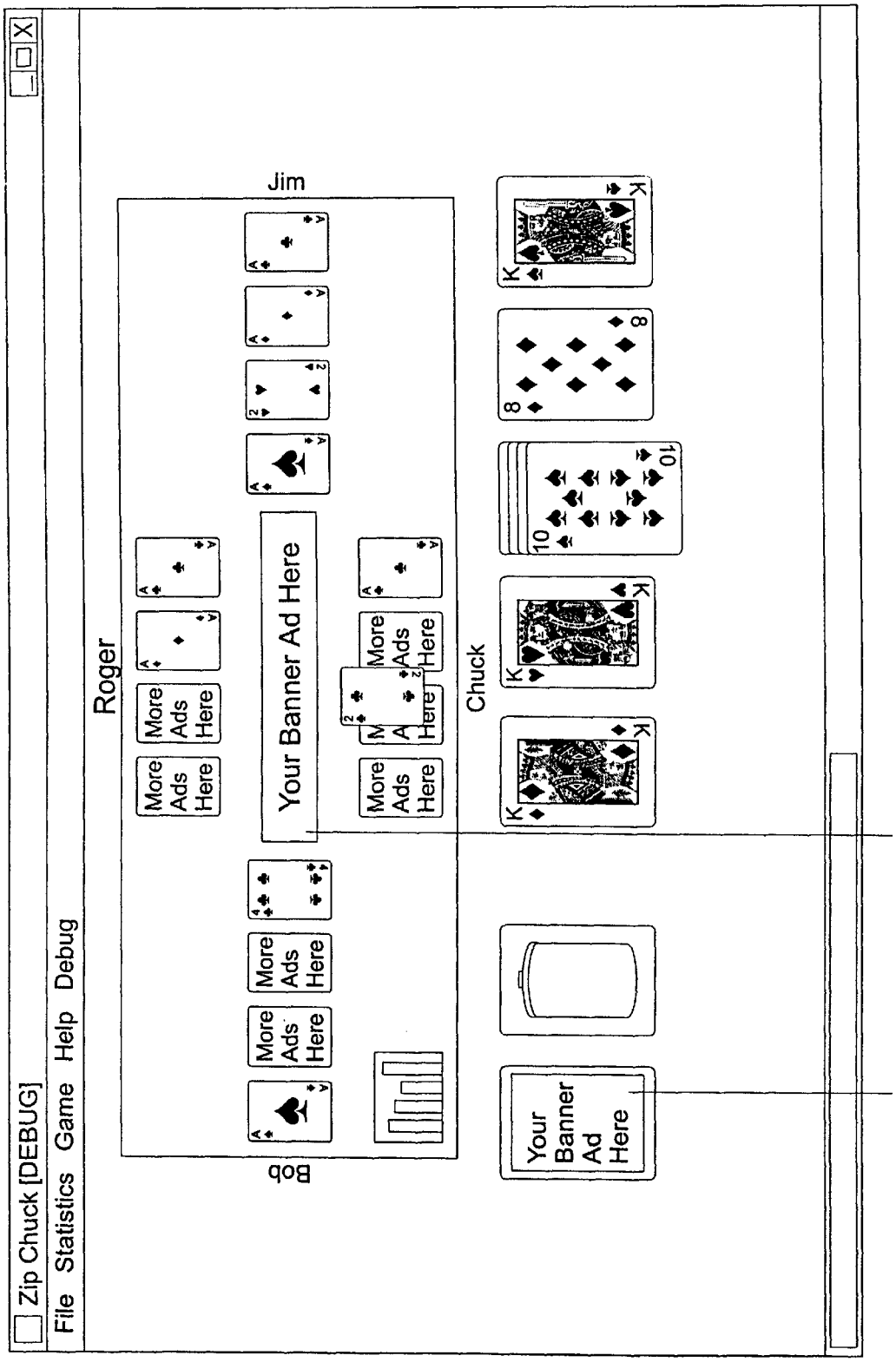
FIG. 12 illustrates a computer screen in which game elements (card backs and card placement positions) are utilized to provide one or more advertisements.

In addition to the above-described variable advertisement of FIGS. 6–7 and 10–11, one or more continuous advertisements can be provided to each of the client machines 30-1a through 30-4a while the multi-player solitaire card game is being played using these client machines. FIG. 12 diagrammatically illustrates the presentation of a continuous advertisement utilizing a card back 140 of the cards of the multi-player solitaire card game. The depicted background or table area on which the card layouts are illustrated includes an area for banner ad 150. More specifically, an advertisement can be displayed on the backs of the cards as indicated in the illustration of player one's client machine 30-1a. Similarly, the same or different advertisement can be displayed on the background or table area intermediate the foundation piles of the four players.

With respect to providing such a continuous advertisement, comparable steps are employed in obtaining and downloading the advertising related information from the database server 70, to the client machines 30-1a through 30-4a, but under the responsibility of the ad server 60-1. Access to the locations of the advertisement(s) is provided using the URL associated with such an advertisement. The advertisement is integrated or otherwise associated with the game elements and their graphics, such as the card backs and table areas. That is, each client machine 30-1a through 30-4a correlates the game element graphics with the particular advertisement that is to be incorporated therewith in connection with the computer screens of these client machines properly displaying the designated game elements or pieces with the predetermined continuous advertisement(s). Like the variable advertisements, the continuous advertisements can be changed or updated between successive games and a determination is made to ensure that there is sufficient time to accomplish any continuous advertisement change between games. In a case, for example, where the continuous advertisement could not be timely integrated with the game element or elements before the players begin playing the game, a default continuous advertisement could be utilized, which might include no continuous advertisement at all.

Figure 13:
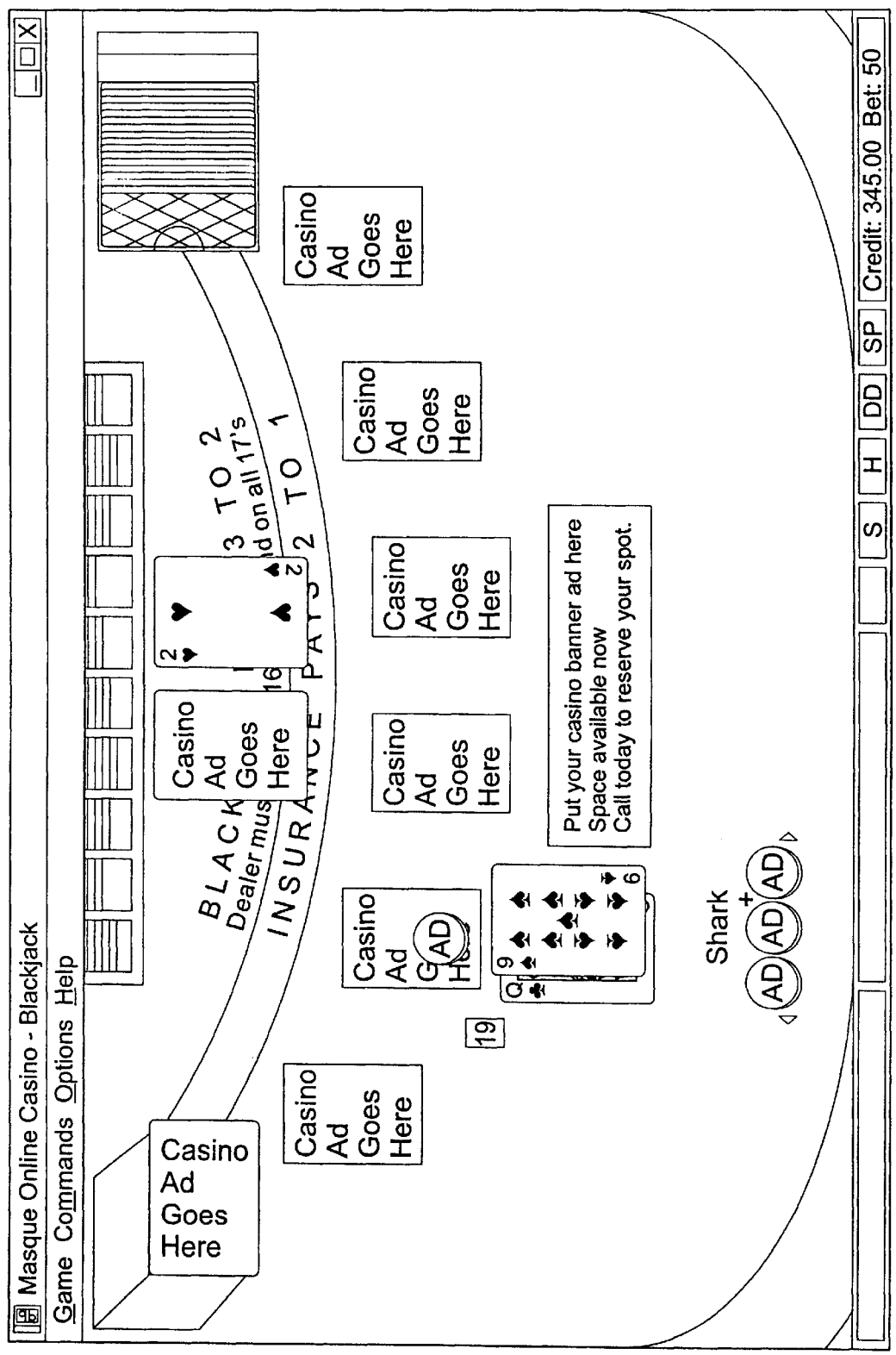
FIG. 13 illustrates a computer screen showing a game different from FIG. 3 in which one or more advertisements are displayed as part of the game.

With reference to FIG. 13, another card game is illustrated on a computer screen of a player for depicting other game elements that can be utilized for continuous or persistent advertisements while the game is being played. In particular, the illustrated blackjack card game has table felt areas, card playing or location areas, and money chips that can include one or more advertisements. As with FIG. 12, any such advertising information is received by each of the client machines 30 that are playing the particular blackjack card game. Such advertising information is utilized to obtain and associate the desired advertisement with these game graphics or game elements.

Figure 14:
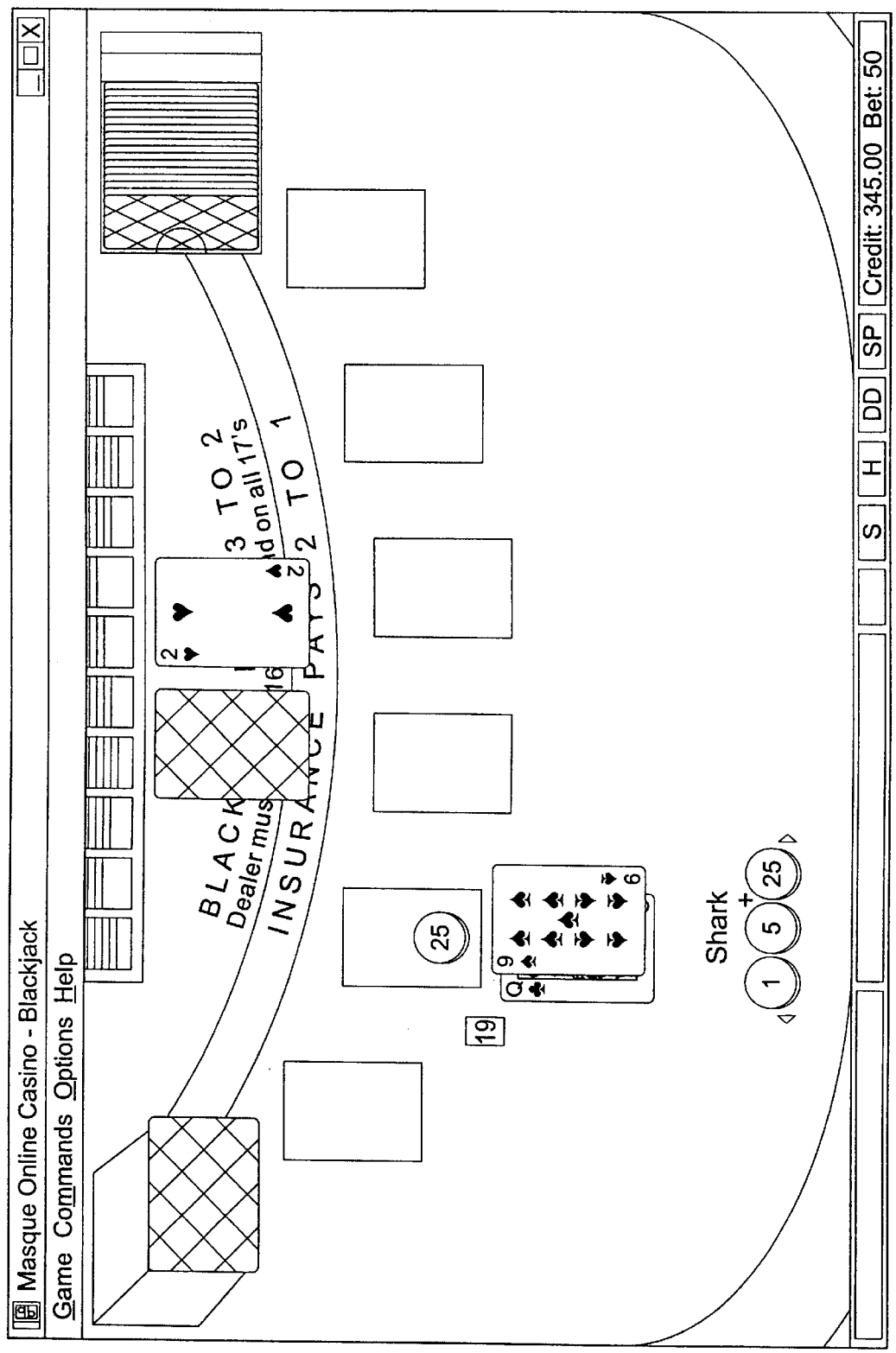
FIG. 14 illustrates the computer screen of a player playing an on-line card game during a representative time that the game is being played, before new game elements are added or game elements are changed.
Figure 15:
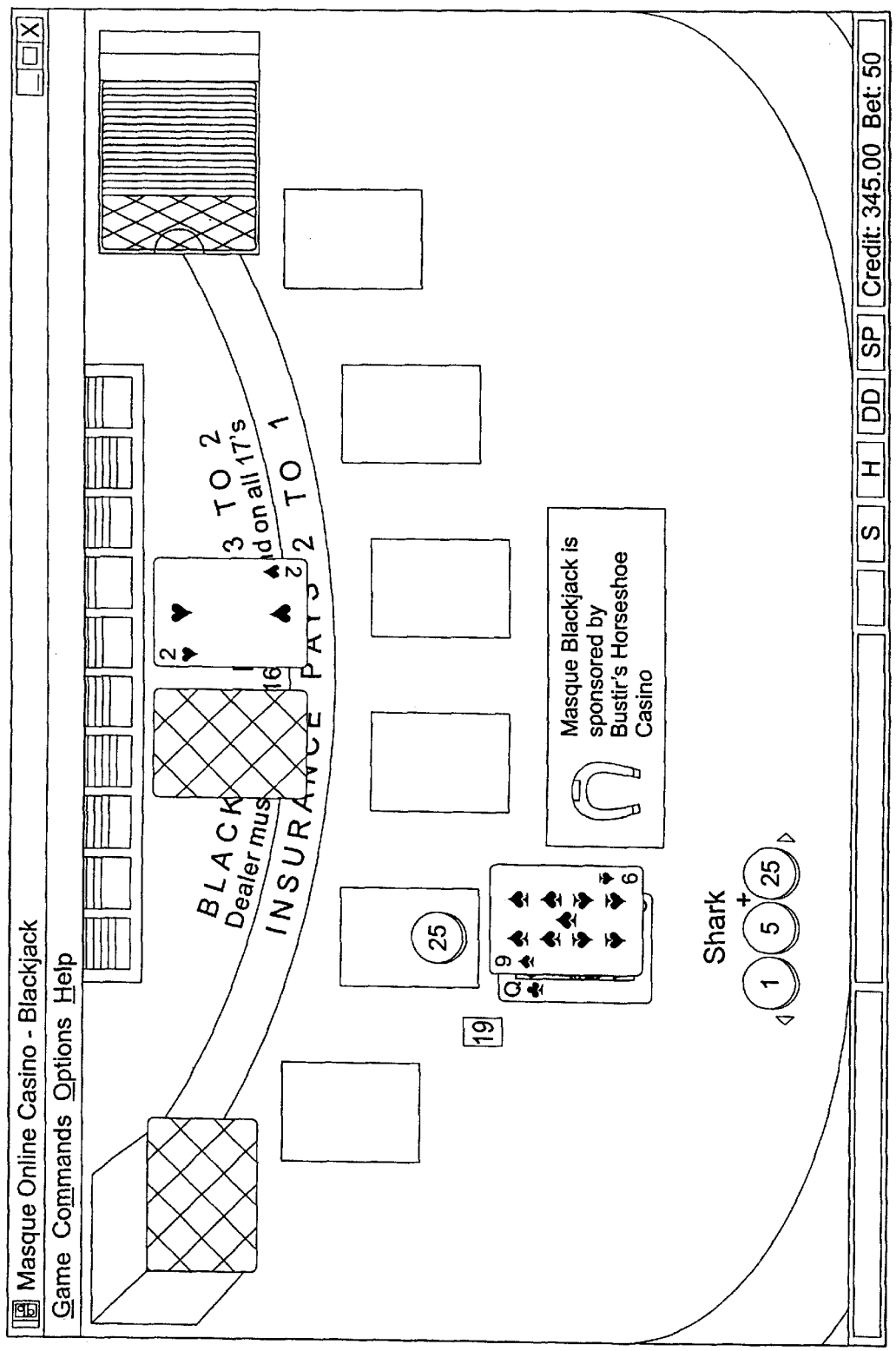
FIG. 15 illustrates the computer screen of that same player in FIG. 14, with an advertisement displayed on the computer screen, this advertisement contains an element that will become a game element.

In FIG. 14, a card game is illustrated on a computer screen of a player for depicting how game objects or elements that serve as advertisements are created in, appear in or are changed from an advertisement. This attracts more player attention to the advertisement and/or the game elements. FIG. 14 depicts the computer screen before new game elements are added or changed. In FIG. 15, an advertisement appears on the game screen. Appearing on the advertisement in FIG. 15 is an element that will become a game element, which game element will also serve as an advertisement.

Figure 16:
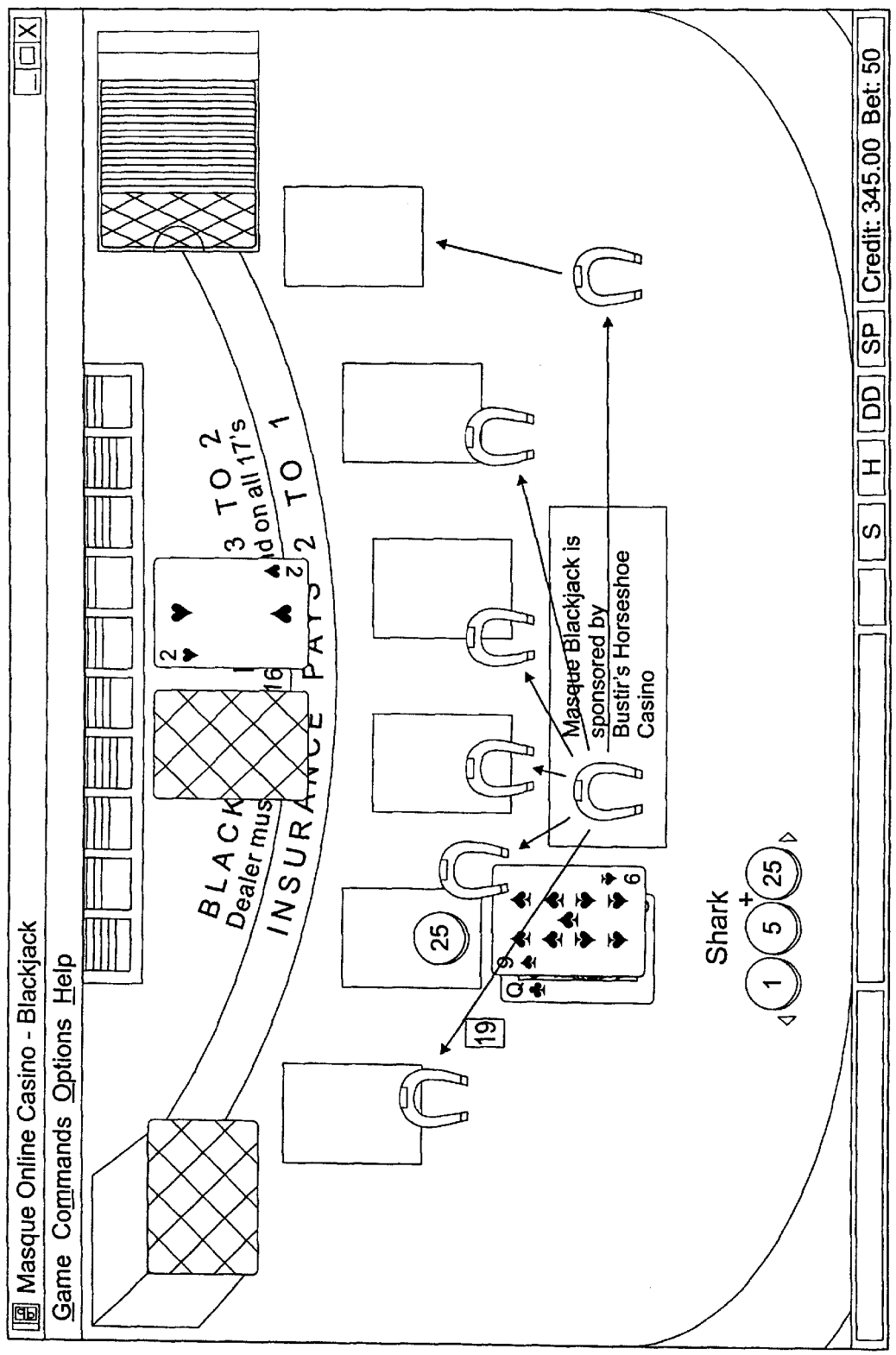
FIG. 16 illustrates the computer screen, of that same player in FIG. 14 and FIG. 15, in which an advertising element becomes a game element, which game element will also serve as an advertisement.
Figure 17:
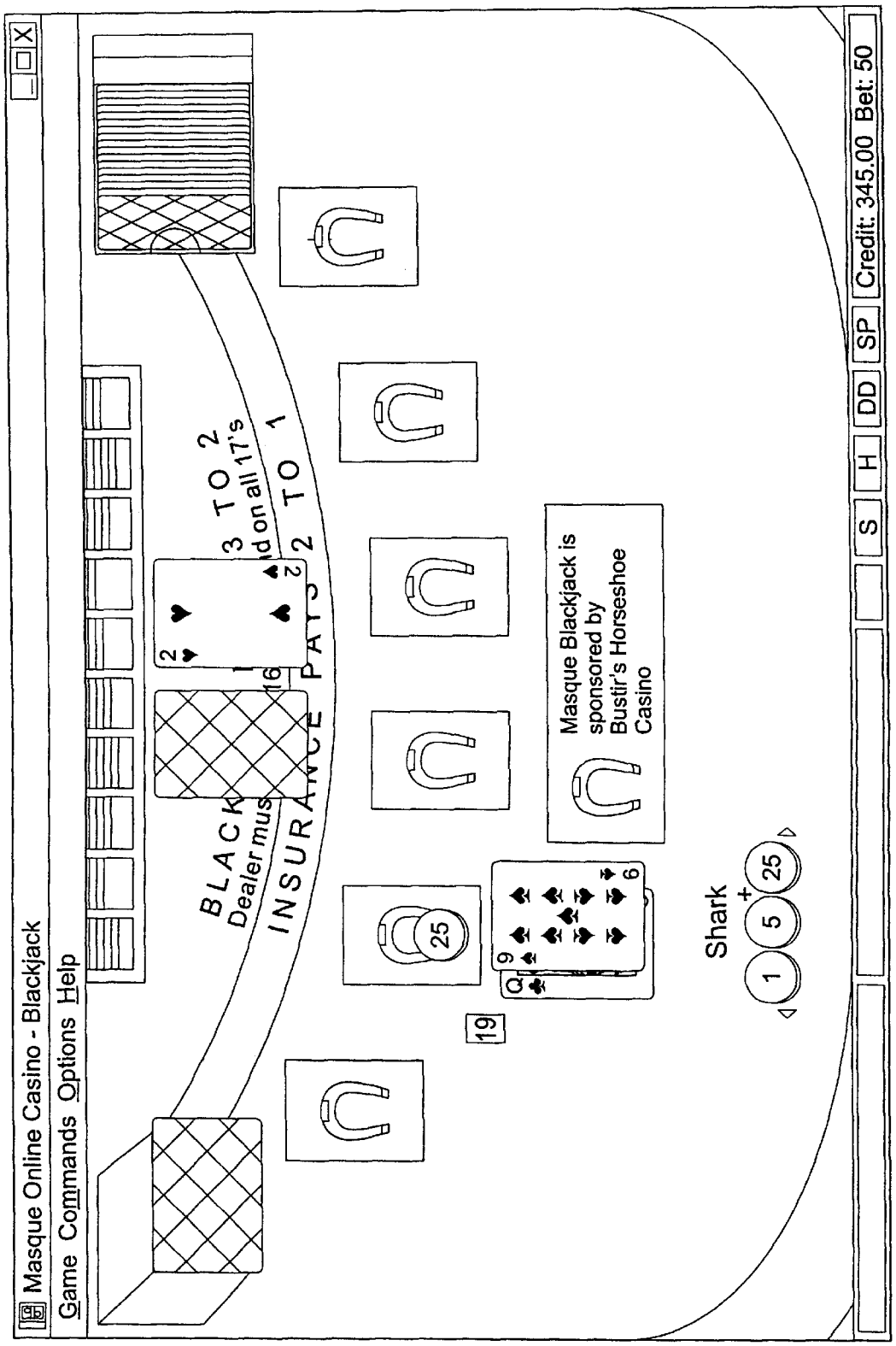
FIG. 17 shows the game element, that formerly originated as part of the advertisement shown in FIG. 15, now as a game element, which game element is also serving as an advertisement.

With reference to FIG. 16, an element of the advertisement is animated and moved from the advertisement to the game screen and becomes an element of the game itself. This action attracts additional attention to the game element that is serving as an advertisement as well as the advertisement itself. FIG. 17 shows the game element, formerly part of the advertisement shown in FIG. 15, that serves now as an advertisement and part of the actual game. Game objects can be created in, first appear in or be changed from an advertisement. Further animation of the game objects within the game itself can occur. Upon certain actions or appearances of those game objects, a user could respond. Advertisements themselves could inform the users which actions or appearances of game objects warrant a response, the type of user response desired or accepted and the result of the user response.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best modes presently known of practicing the invention and to enable others skilled in the art to utilize the invention as such, or in other embodiments, and with the various modifications required by their particular application or uses of the invention. By way of example only, although the Detailed Description has been directed to on-line card or board games, it should be understood that at least certain aspects of the invention are applicable to other on-line games including, but not limited to, action/adventure games that utilize action figures. Such action figures constitute game elements that can have advertisements integrated therewith. Furthermore, such other on-line games can provide advertisements in which their display is under player or user control after a predetermined time interval and statistical data relating to the results of such advertisements can be obtained. It is also intended that the appended claims be construed to include alternative embodiments to the extent permitted by the prior art.

What is claimed is:

1. A method for playing on-line card and board games while providing advertising, comprising:

providing game software with a first client machine, said game software is executed on said first client machine for playing at least one of a first on-line card game and a first on-line board game having a number of game elements including a first game element;

receiving first advertising information by said first client machine from a central subsystem, said first advertising information being correlated with said first game element;

displaying said first advertising information confined within said first game element using said game software executing on said first client machine; and controlling location of said first advertising information using said game software during playing of said one of said first on-line card game and said first on-line board game.

2. A method, as claimed in claim 1, wherein:

said providing step includes downloading said game software to said first client machine by said central subsystem in communication with said first client machine.

3. A method, as claimed in claim 1, wherein:

said displaying step includes displaying said first advertising information with at least one of the following: a back of a playing card, a board piece, and a money chip.

4. A method, as claimed in claim 1, wherein:

said controlling step includes controlling said first advertising information to be located with said first game element when said first game element is caused to move during playing of said at least one of said first on-line card game and said first on-line board game.

* * * * *